(12) United States Patent
Chambers et al.

(10) Patent No.: US 8,010,154 B2
(45) Date of Patent: Aug. 30, 2011

(54) RETRACTABLE ROTATABLE CAMERA MODULE FOR MOBILE COMMUNICATION DEVICE AND METHOD OF OPERATION THEREOF

(75) Inventors: Michael J. Chambers, Erlangen (DE); Michael Kiessling, Freising (DE)

(73) Assignee: Agere Systems Inc., Allentown, PA (US)

( * ) Notice: Subject to any disclaimer, the term of this patent is extended or adjusted under 35 U.S.C. 154(b) by 1140 days.

(21) Appl. No.: 11/749,731

(22) Filed: May 16, 2007

(65) Prior Publication Data

US 2007/0273752 A1 Nov. 29, 2007

Related U.S. Application Data

(63) Continuation-in-part of application No. 10/825,460, filed on Apr. 15, 2004, now abandoned.

(51) Int. Cl.
*H04M 1/00* (2006.01)
*H04B 1/38* (2006.01)

(52) U.S. Cl. .................. 455/556.1; 455/566; 455/575.1

(58) Field of Classification Search ............... 455/556.1, 455/556.2, 566, 557, 575.1, 90.3; 348/14.02, 348/14.01, 14.03, 14.07, 14.08, 14.16
See application file for complete search history.

(56) References Cited

U.S. PATENT DOCUMENTS

| | | | |
|---|---|---|---|
| 6,518,993 B2 * | 2/2003 | Kerai et al. ................ 348/14.01 |
| 6,532,035 B1 * | 3/2003 | Saari et al. ................ 348/14.02 |
| 6,559,881 B1 * | 5/2003 | Vooi-Kia et al. ........... 348/14.08 |
| 6,657,654 B2 * | 12/2003 | Narayanaswami ......... 348/14.04 |
| 6,785,935 B2 | 9/2004 | Ahn et al. |
| 6,795,715 B1 * | 9/2004 | Kubo et al. ................. 455/556.1 |
| 6,904,298 B2 * | 6/2005 | Arai et al. .................. 455/556.1 |
| 7,090,136 B2 * | 8/2006 | Muramatsu .............. 235/462.25 |
| 7,174,195 B2 * | 2/2007 | Nagamine .................. 455/575.1 |
| 7,200,423 B2 * | 4/2007 | Bum .............................. 455/566 |
| 7,496,378 B2 * | 2/2009 | Kawamura ................. 455/556.1 |
| 7,742,073 B1 * | 6/2010 | Cohen-Solal et al. ......... 348/169 |
| 2002/0048459 A1 * | 4/2002 | Mishio .......................... 396/429 |
| 2002/0093493 A1 * | 7/2002 | Michaeli et al. .............. 345/173 |
| 2002/0160724 A1 * | 10/2002 | Arai et al. ........................ 455/90 |
| 2003/0036365 A1 * | 2/2003 | Kuroda ............................ 455/90 |
| 2003/0090579 A1 * | 5/2003 | Ohe et al. ................... 348/240.3 |
| 2003/0171133 A1 * | 9/2003 | Mizuta et al. ................. 455/550 |
| 2003/0174239 A1 * | 9/2003 | Sawada .......................... 348/373 |
| 2004/0041911 A1 * | 3/2004 | Odagiri et al. ............. 348/207.1 |
| 2004/0095500 A1 * | 5/2004 | Sato et al. ..................... 348/340 |
| 2004/0116167 A1 * | 6/2004 | Okuzako et al. ........... 455/575.3 |
| 2004/0198433 A1 * | 10/2004 | Lee ............................. 455/556.1 |
| 2004/0242263 A1 * | 12/2004 | Nishimoto et al. ......... 455/550.1 |
| 2005/0014527 A1 | 1/2005 | Chambers et al. |
| 2006/0152576 A1 * | 7/2006 | Kiessling et al. .......... 348/14.01 |
| 2007/0279481 A1 * | 12/2007 | Chambers et al. ......... 348/14.01 |
| 2008/0064437 A1 * | 3/2008 | Chambers et al. ......... 455/556.1 |

FOREIGN PATENT DOCUMENTS

EP 0930770 A3 8/2000

(Continued)

*Primary Examiner* — Brandon J Miller

(57) ABSTRACT

A mobile communication device having a camera module and a method of operating a mobile communication device having a camera module. In one embodiment, the mobile communication device includes: (1) a main body and (2) a camera module, coupled to the main body and configured for movement with respect thereto between a retracted position and an exposed position and rotatable in the exposed position about at least one axis of rotation.

19 Claims, 4 Drawing Sheets

FOREIGN PATENT DOCUMENTS

| | | |
|---|---|---|
| EP | 1168810 A3 | 2/2002 |
| EP | 1429531 A1 | 6/2004 |
| GB | 2364196 A | 1/2002 |
| GB | 2389988 A | 12/2003 |
| JP | 10075287 A | 3/1998 |
| JP | 11112860 A | 4/1999 |
| WO | 2004054229 A1 | 6/2004 |

\* cited by examiner

RETRACTABLE ROTATABLE CAMERA MODULE FOR MOBILE COMMUNICATION DEVICE AND METHOD OF OPERATION THEREOF

CROSS-REFERENCE TO RELATED APPLICATION

This application is a continuation-in-part of U.S. patent application Ser. No. 10/825,460, entitled "RETRACTABLE ROTATABLE CAMERA MODULE FOR MOBILE COMMUNICATION DEVICE AND METHOD OF OPERATION THEREOF", filed on Apr. 15, 2004, by Michael J. Chambers, et al., which is abandoned. The above-listed application is commonly assigned with the present invention and is incorporated herein by reference as if reproduced herein in its entirety.

TECHNICAL FIELD OF THE INVENTION

The present invention is directed, in general, to wireless telecommunications and, more specifically, to a retractable rotatable camera module for a mobile communication device and method of operating the same.

BACKGROUND OF THE INVENTION

Mobile communication devices, such as mobile telephones, are increasingly used for more than just speech communication. A variety of applications like messaging services, data communication, e-mail or fax services have become available to the users of mobile communication devices.

The ongoing development in digital imaging devices makes it possible today to equip mobile communication devices with digital cameras at affordable prices, which gives rise to a host of new multimedia services. Such digital cameras allow one party to take digital photographs and send them to another by means of the well known multimedia message system (MMS) standard. Even video telephony can be established between two mobile communication devices, provided they are each equipped with a camera. The display is integral part of such applications, for viewing functions in the case of digital photography or so each party can see the other in the case of video telephony.

A problem, which consequently arises is that a different arrangement of display in relation to camera is required to support services such as digital photography and video telephony in the same device. More specifically, they have to face in opposite directions in digital photography, whereas the display and camera have to face in the same direction in video telephony.

This problem can be solved by equipping the mobile communication device with two cameras, one facing in the same and another facing in the opposite direction of the display. The use of two cameras in a single mobile communication device is taught in, for instance, U.S. patent application publication US 2003/0036365 to Kuroda, entitled "Portable Communications Terminal with Camera Capable of Taking Pictures." However, using two cameras leads to a significantly more expensive and complex mobile communication device.

Accordingly, what is needed in the art is a less expensive way to bring both digital photography and video telephony functionality to a mobile communication device.

SUMMARY OF THE INVENTION

The present invention addresses the above-described shortcomings of the prior art by introducing a mobile communication device with imaging means, which can be flexibly used for different applications or services, such as digital photography or video telephony.

To address the above-discussed deficiencies of the prior art, in one aspect, the present invention provides a mobile communication device having a camera module and a method of operating a mobile communication device having a camera module. In one embodiment, the mobile communication device includes: (1) a main body and (2) a camera module, coupled to the main body and configured for movement with respect thereto between a retracted position and an exposed position and rotatable in the exposed position about at least one axis of rotation.

In another aspect, the present invention provides a mobile communication device. In one embodiment, the mobile communication device includes: (1) a main body having attaching means for attaching a camera module and (2) a camera module having complementary attaching means to the main body, such that the camera module is movable with respect to the main body from a retracted position to an exposed position and is rotatable in the exposed position about at least one axis of rotation.

In yet another aspect, the present invention provides a camera module. In one embodiment, the camera module includes: (1) attaching means for attaching the camera module to complementary attaching means of a mobile communication device and (2) a camera, coupled to the attaching means, the camera movable with respect to a main body of the mobile communication device from a retracted position to an exposed position and rotatable in the exposed position about at least one axis of rotation.

In still another aspect, the present invention provides a method of operating a retractable rotatable camera module. In one embodiment, the method includes: (1) deploying the camera module by releasing a user-releasable retainer, the camera module to move from a retracted position to an exposed position with respect to a main body of an associated mobile communication device and (2) rotating the camera module about at least one axis of rotation.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
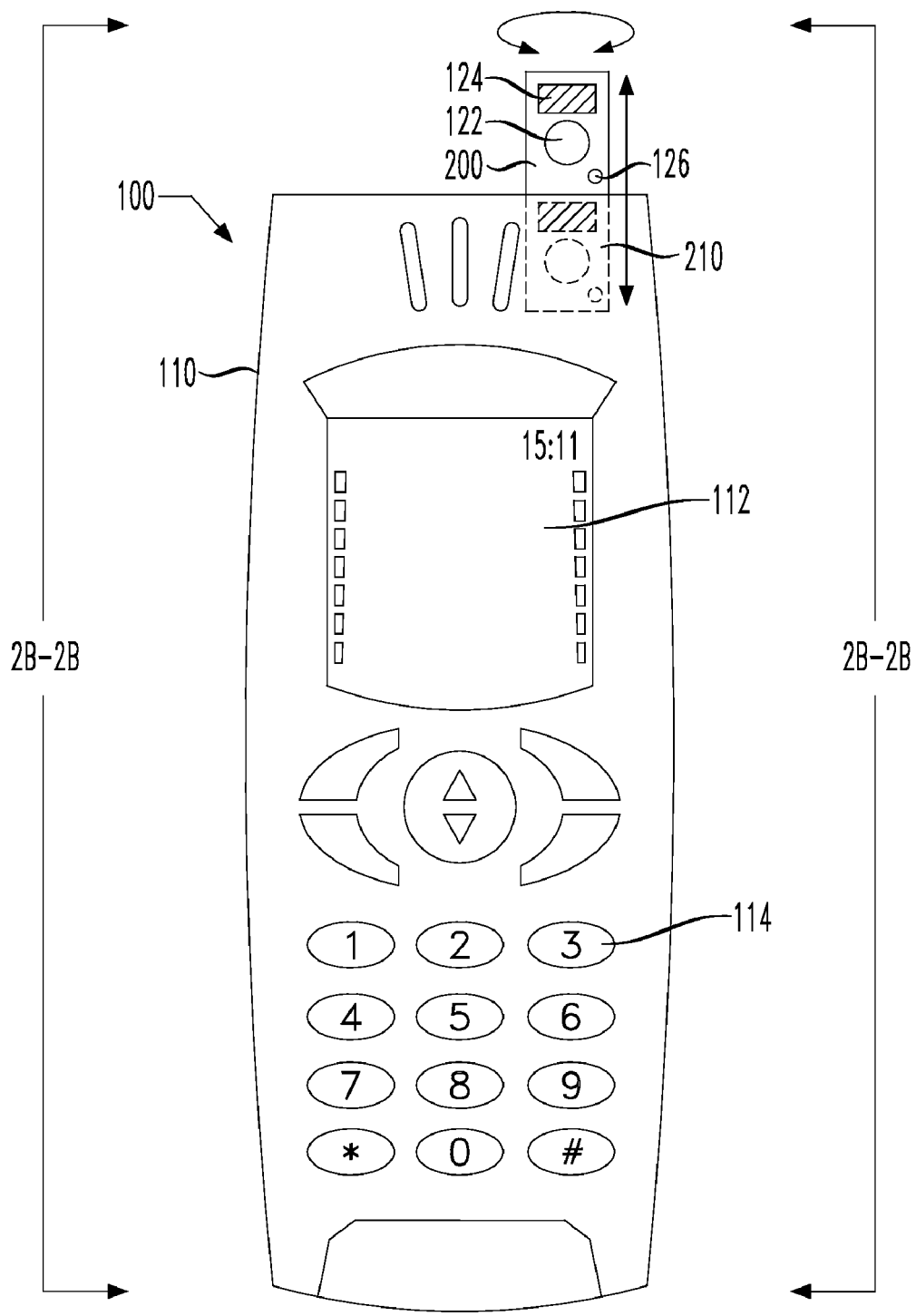
FIG. 1 illustrates a schematic front view of one embodiment of a mobile communication device with a retractable camera module rotatable about one axis of rotation and constructed according to the principles of the present invention.

Referring initially to FIG. 1, illustrated is a mobile telephone 100, which is equipped with a retractable and rotatable camera module 200. When in use the camera module 200 is in the exposed position shown in FIG. 1. When the camera associated with the camera module 200 is not in use, the camera module 200 is retractable into a main body 110 of the mobile telephone 100. This retracted position is indicated by reference number 210.

In this embodiment the camera module 200 comprises a flash 124 and a self-timer (not shown), which is connected to a light-emitting diode (LED) 126 for indicating the elapsing of the delay time of the self-timer.

The camera module 200 is shown with a lens 122 thereof facing to the front side of the mobile telephone 100, the front side being defined as the side of the mobile telephone 100 on which a display 112 and a keypad 114 are arranged. This is the typical position suitable for an application such as video conferencing. By rotating the camera module 200 by about 180°, the camera module 200 now faces to the back side of the mobile telephone 100, which is a suitable position for taking digital photographs.

The camera module 200 is shown in FIG. 1 as being mounted at the top side of the mobile telephone 100. Of course, the camera module 200 could be mounted at the side of the mobile telephone 100 or at any position, in which it can be rotated to face to the front or the back side of the mobile telephone 100 as described above.

Certainly, the invention is not limited to mobile telephones, but can also be used for personal digital assistants (PDAs) or mobile digital assistants (MDAs) or any other conventional or later-developed mobile communication device.

Figure 2A:
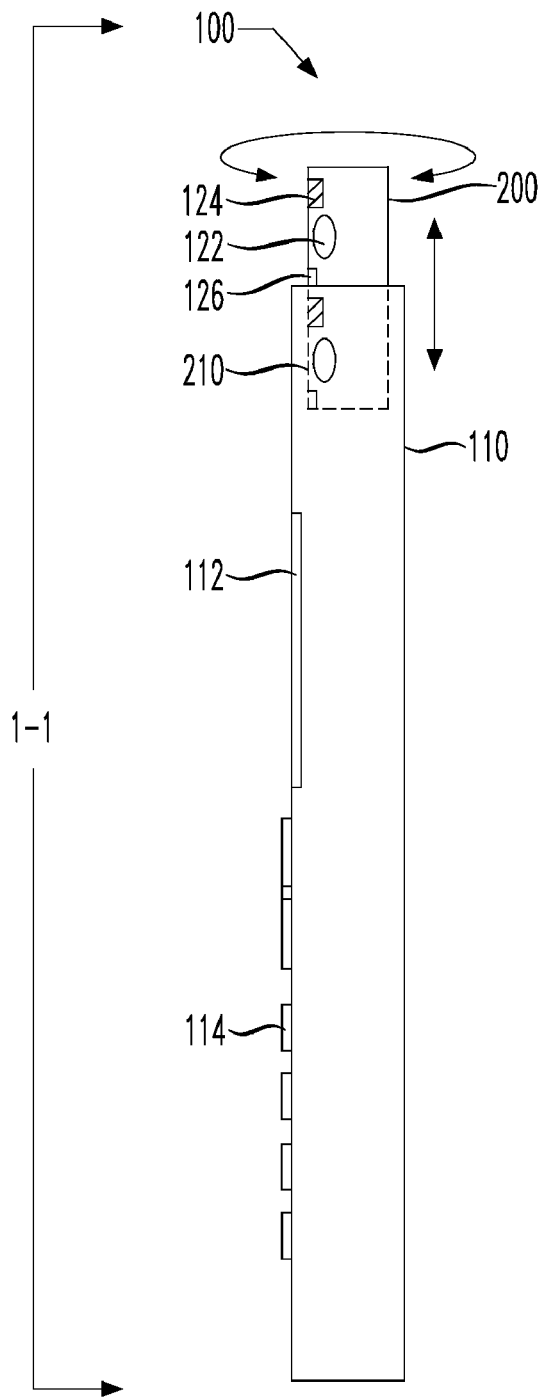
FIGS. 2A and 2B illustrate schematic right-hand side views of the mobile communication device of FIG. 1 with the camera module in a front side (FIG. 2A) and a back side (FIG. 2B) position.
Figure 2B:
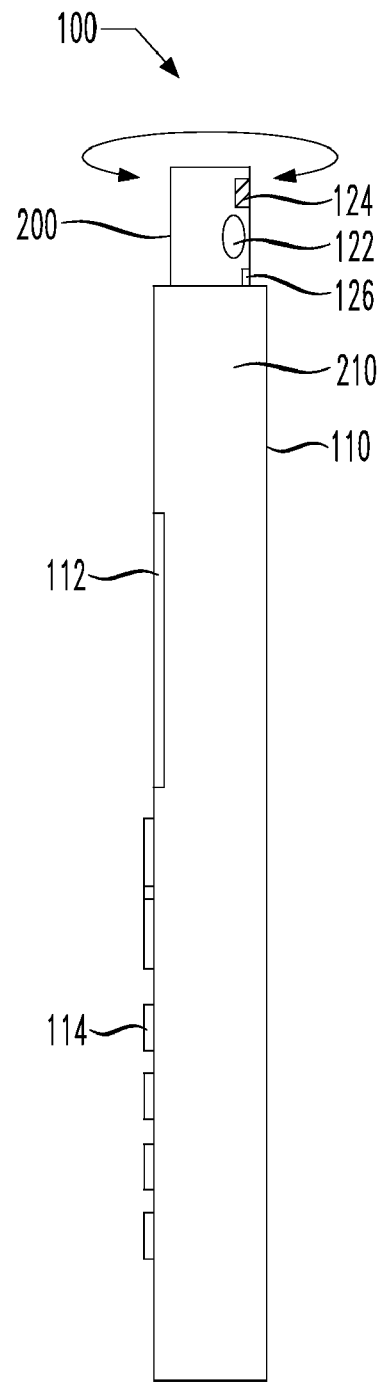

Turning now to FIGS. 2A and 2B, the mobile telephone 100 of FIG. 1 is shown from the left-hand side to demonstrate further the rotating movement of the camera module 200. In FIG. 2A, the camera module 200 is in the front side position. In FIG. 2B, the camera module 200 is rotated by about 180°, which causes the camera module 200 to face the back side of the mobile telephone 100.

Figure 3:
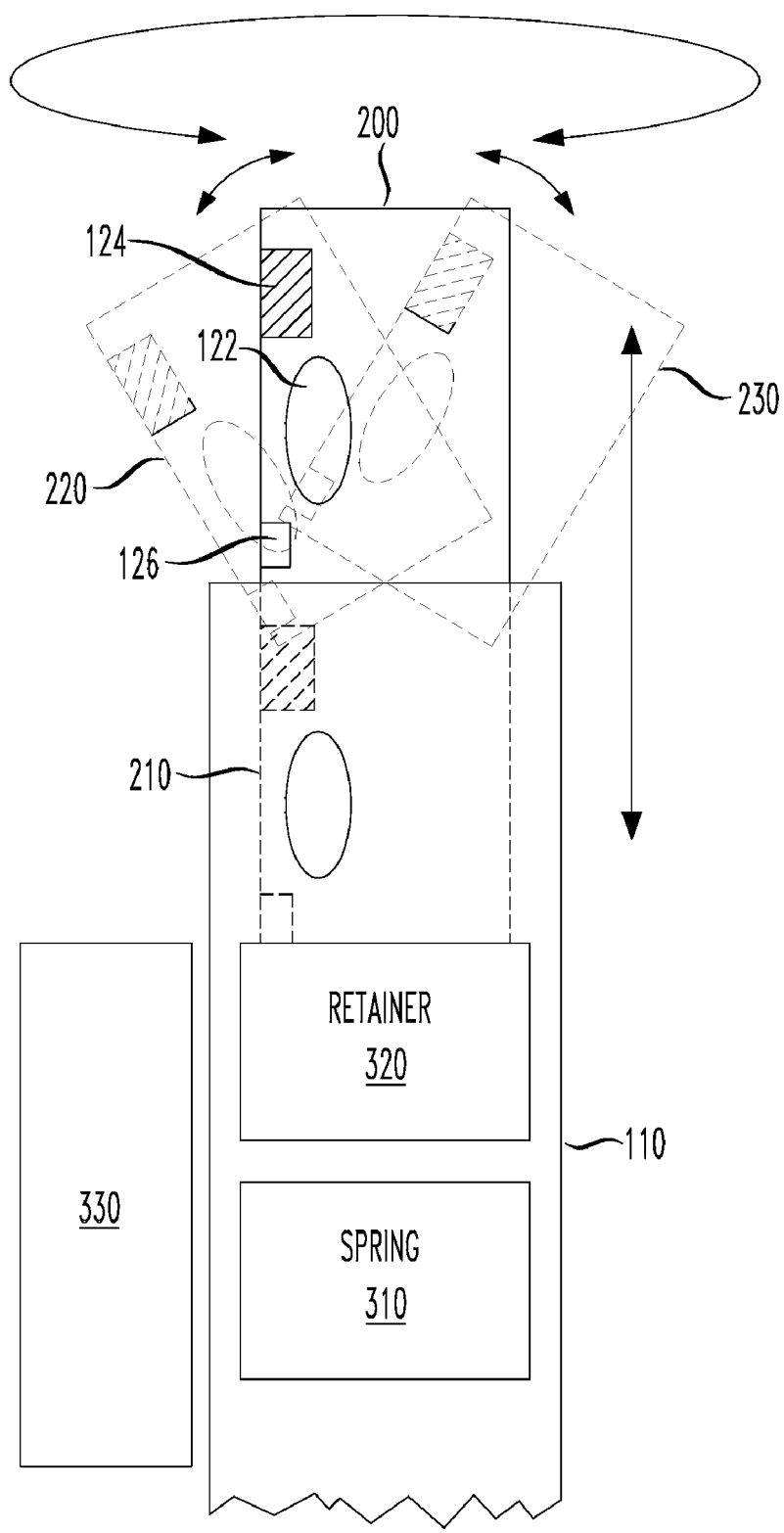
FIG. 3 illustrates an enlarged schematic side view of a second embodiment of a camera module rotatable about two axes of rotation and constructed according to the principles of the present invention.

Turning now to FIG. 3, illustrated is another embodiment of the camera module 200. In this embodiment, the camera module 200 is rotatable about two axes of rotation, which are essentially perpendicular to one another. That way the camera module 200 can not only be rotated about a vertical axis as shown in FIGS. 1, 2A and 2B, but can also be tilted and thus rotated about a horizontal axis of rotation. Positions, in which the camera module is tilted forward and backward are indicated by reference numbers 220 and 230 respectively.

FIG. 3 also shows, in highly schematic form, an optional spring 310, by which the camera module 200 can be automatically ejected and brought into the exposed position. For this purpose, an optional user-releasable retainer 320 may be provided to retain the spring in a compressed position until the user releases it. Finally, if the camera module 200 is wholly detachable from the mobile telephone 100 of FIG. 1, an attaching means 330 is associated with the camera module 200. The attaching means 330 releasably engages a corresponding attaching means located on or in the mobile telephone 100.

Figure 4:
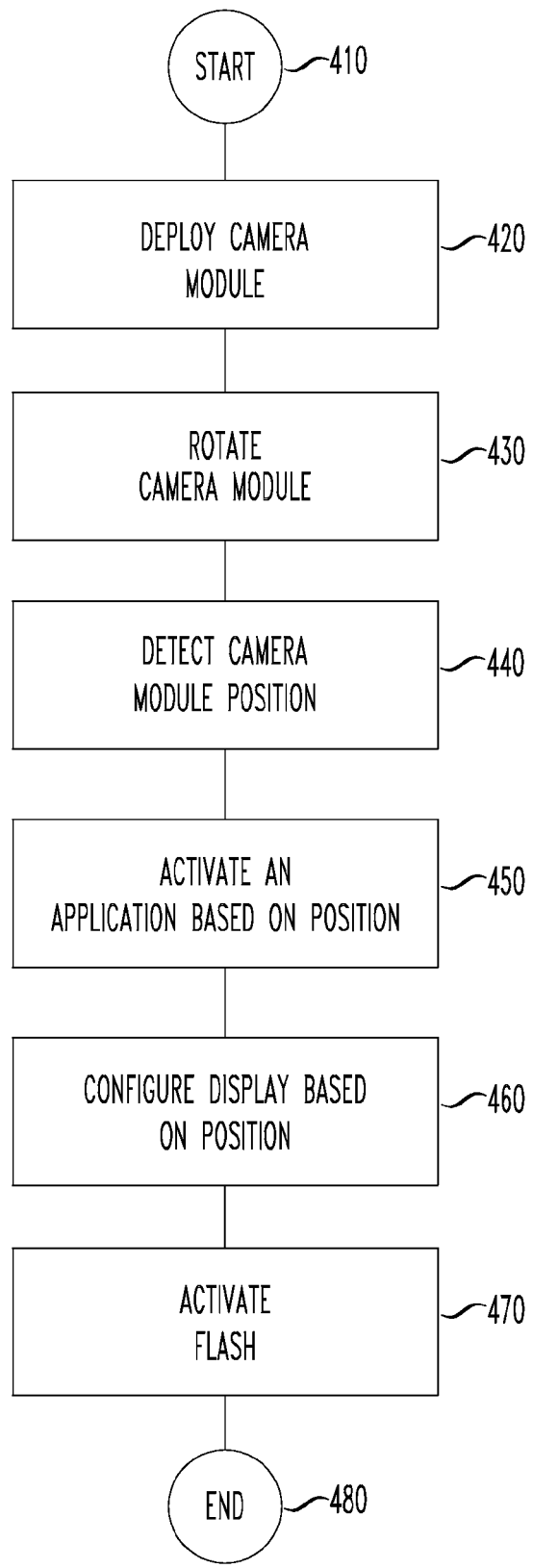
FIG. 4 illustrates a flow diagram of one embodiment of a method of operating a retractable rotatable camera module for a mobile communication device carried out according to the principles of the present invention

Turning now to FIG. 4, illustrated is a flow diagram of one embodiment of a method of operating a retractable rotatable camera module for a mobile communication device carried out according to the principles of the present invention. The method begins in a start step 410 when a user wishes to deploy a camera either to take a digital photograph or engage in video telephony.

The method proceeds to a step 420 in which a user deploys a camera module containing the camera by releasing a user-releasable retainer. In response, a spring extends, causing a camera module to move from a retracted position to an exposed position with respect to the main body of the mobile communication device.

Next, in a step 430, the user rotates the camera module about at least one axis of rotation. Then, in an optional step 440, a detector, in particular an electronic detector, detects the position of the camera module relative to the main body of the mobile communication device, including perhaps the rotational orientation of the camera module. The power supply of the camera module may then be automatically switched on. Detection of the position could also be accomplished via a magnetic switch, electrical resistance, etc.

In a step 450, the mobile communication device automatically initiates a particular application based on the detected position of the camera module. The particular application may be for digital photography or for video telephony. For example, depending on the detected rotation angle of the camera module, the mobile communication device launches either a video telephone application or a view finder application. If the lens of the camera module is "looking" into the direction of the user, a front side position, the video telephone application is started. If the lens of the camera module is detected in a back side position, away from the keypad and display of the mobile communication device, the view finder, or digital photography application, is started.

In addition to the front side and back side positions, particular applications may be automatically initiated based on detected positions of the camera module therebetween. The applications that are initiated and the detected positions that initiate the applications can be programmed by the user. Configuration data associated with the different applications can be predetermined and stored in the memory of the mobile communication device. Functions associated with the different applications may also be stored in the memory and activated by the different applications. For example, considering the position towards the user, the front position, is angle 0°. At the 0° angle, a video telephony application is initiated. As such, the camera module can be automatically setup for the proper brightness and contrast associated with video telephony. The proper brightness and contrast may be predetermined and stored in a memory of the mobile communication device. In addition to configuring the camera module, a video call to a pre-programmed target may be initiated by the video telephony application.

If the back side position, 180° angle, is detected, the digital photography application may be automatically initiated. As such, the camera module can be configured for highest quality pictures. Configuration data for the digital photography can be predetermined and stored in the memory of the mobile communication device.

If a position between the front side and back side is detected, such as at an angle of 90°, a video recorder application can be automatically initiated. For example, after turning the camera module into 90° position, video recording may automatically start and no extra shutter release is required for the camera module. Additionally, functions may be automatically assigned by the video recorder application. For example, functions may be assigned to the keypad such that stopping, starting, restarting, etc., is possible via employing the keypad. Voice commands may also be activated and employable.

If an angle of 270° is detected, a still image application may be initiated. The still image application can include different settings for the camera module compared to the digital photography application. For example, the resolution may be higher or the shutter speed may be slower.

The automatic initiation of applications based on a detected position may differ depending on the current status of the mobile communication device. For example, if a video call is in progress and the camera module is turned away from the front position, the video call can remain ongoing. Nevertheless, in some embodiments, pushing the camera module back into the camera body may terminate a video call.

The method 400 then proceeds to configuring a display of the mobile communication device based on the detected position in a step 460. If a front side position is detected, the display can be configured for a predetermined pixel resolution for video telephony. Additionally, if a back side position is detected, the display may be configured for a different pixel resolution for digital photography. The various parameters for configuring the display per the associated applications may be stored in the memory of the mobile communications device.

Next, in an optional step 470, a flash may be activated if the user intends to take a digital photograph. A self-timer may be used to measure a delay time before automatically taking a photograph. The elapsing of the delay time can be indicated by appropriate indicator, such as an LED, which may flash with an ascending frequency during the delay time. The method ends in an end step 480, when the user ostensibly urges the camera module back into a retracted position within the main body.

Although the present invention has been described in detail, those skilled in the art should understand that they can make various changes, substitutions and alterations herein without departing from the spirit and scope of the invention in its broadest form.

What is claimed is:

1. A mobile communication device, comprising: a main body; a camera module, coupled to said main body and configured for movement with respect thereto between a retracted position and an exposed position and rotatable in said exposed position about at least one axis of rotation; means for detecting a position of said camera module relative to said main body; and a memory with at least one stored program which can be executed, said program automatically configuring a display of said mobile communication device for one of digital photography and video telephony based on said detected position, wherein said automatically configuring includes determining a pixel resolution for said display.

2. The mobile communication device as recited in claim 1 wherein said camera module translates to move between said retracted position and said exposed position.

3. The mobile communication device as recited in claim 1 wherein said at least one axis of rotation is essentially perpendicular to a direction of said movement.

4. The mobile communication device as recited in claim 1 wherein said camera module is rotatable at least from a front side position to a back side position in said exposed position.

5. The mobile communication device as recited in claim 4 wherein said display is configured for said digital photography when said camera is detected in said back side position and configured for said video telephony when said camera is detected in said front side position.

6. The mobile communication device as recited in claim 5 wherein said video telephony is video conferencing.

7. The mobile communication device as recited in claim 1 wherein said camera module is rotatable about at least two axes of rotation in said exposed position.

8. The mobile communication device as recited in claim 7 wherein said two axes of rotation are essentially perpendicular.

9. The mobile communication device as recited in claim 1 wherein said program activates a power supply to said camera module.

10. The mobile communication device as recited in claim 1 wherein said means for detecting is an electronic detector.

11. The mobile communication device as recited in claim 1 wherein said program automatically configures said mobile communication device for video recording based on said detected position.

12. The mobile communication device as recited in claim 1 wherein said program automatically configures said mobile communication device for applications based on said detected position, wherein said applications are programmed by a user of said mobile communication device.

13. The mobile communication device as recited in claim 1 wherein said camera module is rotatable for at least 270 degrees around said at least one axis of rotation, wherein said at least one axis of rotation is perpendicular to said main body.

14. The mobile communication device as recited in claim 13 wherein said means for detecting a position of said camera module relative to said main body camera module is configured to detect multiple positions through said at least 270 degrees around said at least one axis of rotation.

15. The mobile communication device as recited in claim 14 wherein said program automatically configures said display for one of digital photography and video telephony based on more than two of said multiple positions.

16. A method of operating a retractable rotatable camera module, comprising: deploying said camera module by releasing a user-releasable retainer, said camera module to move from a retracted position to an exposed position with respect to a main body of an associated mobile communication device; rotating said camera module about at least one axis of rotation; detecting a position of said camera module relative to said main body; and automatically configuring a display of said mobile communication device for one of digital photography and video telephony based on said detected position, wherein said automatically configuring includes determining a pixel resolution for said display.

17. The method as recited in claim 16 wherein said detecting comprises detecting a rotational orientation of said camera module.

18. The method as recited in claim 16 further comprising configuring said display for digital photography when said camera is detected in a back side position and configuring said display for video conferencing when said camera is detected in a front side position.

19. The method as recited in claim 16 wherein said video telephony is video teleconferencing.

* * * * *